US010404795B2

(12) United States Patent
Antony

(10) Patent No.: US 10,404,795 B2
(45) Date of Patent: Sep. 3, 2019

(54) VIRTUAL MACHINE HIGH AVAILABILITY USING SHARED STORAGE DURING NETWORK ISOLATION

(71) Applicant: VMWARE, INC., Palo Alto, CA (US)

(72) Inventor: Jinto Antony, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 553 days.

(21) Appl. No.: 14/243,912

(22) Filed: Apr. 3, 2014

(65) Prior Publication Data

US 2015/0237132 A1 Aug. 20, 2015

(30) Foreign Application Priority Data

Feb. 19, 2014 (IN) .............................. 812/CHE/2014

(51) Int. Cl.
*G06F 15/173* (2006.01)
*H04L 29/08* (2006.01)
*G06F 9/455* (2018.01)

(52) U.S. Cl.
CPC ...... *H04L 67/1095* (2013.01); *G06F 9/45558* (2013.01); *H04L 67/10* (2013.01); *H04L 67/1097* (2013.01); *G06F 2009/45575* (2013.01)

(58) Field of Classification Search
CPC . H04L 67/1095; H04L 67/10; H04L 67/1097; G06F 9/45558; G06F 2009/45575
See application file for complete search history.

(56) References Cited

U.S. PATENT DOCUMENTS

| | | | | |
|---|---|---|---|---|
| 7,484,208 | B1* | 1/2009 | Nelson | G06F 9/45558 711/6 |
| 7,668,924 | B1* | 2/2010 | Young | H04L 67/1097 709/212 |
| 8,135,930 | B1* | 3/2012 | Mattox | G06F 9/45558 711/100 |
| 8,260,904 | B2 | 9/2012 | Nelson | |
| 2003/0225861 | A1* | 12/2003 | Iwamura | H04L 67/1097 709/219 |
| 2007/0005957 | A1* | 1/2007 | Sahita | G06F 21/554 713/156 |
| 2007/0260768 | A1* | 11/2007 | Bender | G06F 12/1081 710/22 |
| 2008/0222375 | A1* | 9/2008 | Kotsovinos | G06F 9/5083 711/162 |
| 2010/0250883 | A1* | 9/2010 | Oshida | G06F 9/5077 711/162 |
| 2011/0004791 | A1* | 1/2011 | Kokubu | G06F 11/0751 714/57 |
| 2011/0320556 | A1* | 12/2011 | Reuther | G06F 9/4856 709/213 |

(Continued)

*Primary Examiner* — Richard G Keehn
(74) *Attorney, Agent, or Firm* — SU IP Consulting

(57) ABSTRACT

In case of network isolation of a host executing one or more virtual machines, the state of the one of more virtual machines is saved using a variety of isolation response mechanisms. Isolation responses may include a live migration to another host using a shared storage system connected to both hosts, a virtual machine suspend and resume operation, and a snapshot reversion operation. The execution state of the virtual machine(s) running on the isolated host, which includes the state of the guest operating system and any running applications, are maintained in the other host, even after host isolation has occurred.

21 Claims, 7 Drawing Sheets

(56) References Cited

U.S. PATENT DOCUMENTS

| | | | | |
|---|---|---|---|---|
| 2012/0017031 A1* | 1/2012 | Mashtizadeh | ....... | G06F 9/45558 711/6 |
| 2013/0014103 A1* | 1/2013 | Reuther | ................ | G06F 3/0647 718/1 |
| 2013/0110959 A1* | 5/2013 | Sharp | .................... | G06F 9/5016 709/212 |
| 2015/0039717 A1* | 2/2015 | Chiu | ................... | H04L 67/2842 709/214 |

* cited by examiner

VIRTUAL MACHINE HIGH AVAILABILITY USING SHARED STORAGE DURING NETWORK ISOLATION

BACKGROUND

Computer virtualization is a technique that involves encapsulating a physical computing machine platform into a virtual machine that is executed under the control of virtualization software on a hardware computing platform. Virtualization software enables multiple virtual machines to be run on a single hardware computing platform, and can manage the allocation of computing resources to each virtual machine.

A set of hardware computing platforms can be organized as a server cluster to provide computing resources for example, for a data center. In addition, supporting technology can move running virtual machines between servers (also referred to herein as "host systems") in the cluster, an example of this supporting technology is sold as VMware VMotion™ by VMware, Inc. of Palo Alto, Calif. In addition, server cluster virtualization management software can determine initial and ongoing locations of virtual machines on hosts within the server cluster, and can manage the allocation of cluster computing resources. An example of this server cluster virtualization management software is sold as VMware Distributed Resource Scheduler™ by VMware, Inc. of Palo Alto, Calif. In addition, high availability software (hereinafter referred to as "HAS") provides features that monitor virtual machines to detect operating system and hardware failures, restart virtual machines on other physical servers in the cluster without manual intervention when server failure is detected, and protect applications from operating system allures by automatically restarting virtual machines when an operating system failure is detected. An example of this high availability software is sold as vSphere™ by VMware, Inc. of Palo Alto, Calif.

In one particular failure scenario, a server may lose network connectivity and becomes isolated from other servers and from the server cluster virtualization management software. In response to such situations, the isolated server might shutdown or power off any virtual machines running on the server. However, the time needed to restart the virtual machines significantly disrupts the availability of the virtual machines, and any state of the guest operating system and application is lost.

SUMMARY

One or more embodiments disclosed herein provide a method for managing execution of a virtual machine on a network isolated host. The method includes detecting network isolation of a first host of a plurality of hosts, wherein the first host comprises a first virtual machine (VM) executing thereon, wherein the plurality of hosts are configured to access a shared storage system. The method further includes transferring execution of the first VM to a second host of the plurality of hosts using the shared storage system, wherein an execution state of the first VM after network isolation has occurred is maintained.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps of detecting network isolation of a first host of a plurality of hosts. The first host may include a first virtual machine (VM) executing there on, and the plurality of hosts are configured to access a shared storage system. The instructions further include transferring execution of the first VM to a second host of the plurality of hosts using the shared storage system, wherein an execution state of the first VM after network isolation has occurred is maintained.

Embodiments of the present disclosure provide a computer system having a plurality of hosts including a first host and a second host, and a shared storage system storing one or more files associated with a first virtual machine (VM). The first host includes a memory, a processor, and a storage interface connected to the shared storage system, wherein the first VM is executing on the first host. The processor is programmed to carry out the steps of detecting network isolation of the first host, and transferring execution of the first VM to the second host using the shared storage system, wherein an execution state of the first VM after network isolation has occurred is maintained

DETAILED DESCRIPTION

Figure 1:
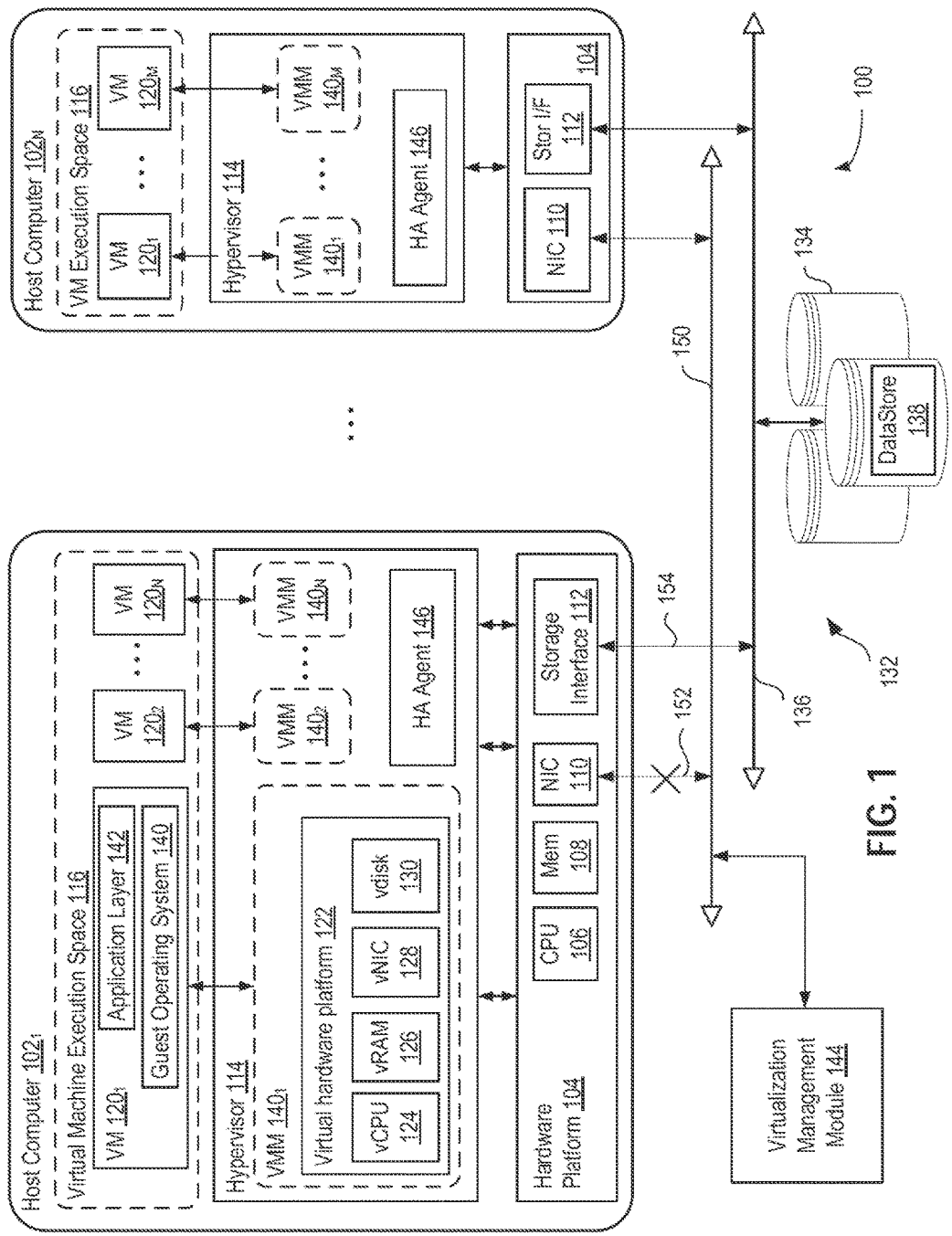
FIG. 1 is a block diagram that illustrates a virtualized computing system with which one or more embodiments of the present disclosure may be utilized.

FIG. 1 depicts a block diagram of a virtualized computing system 100 in which one or more embodiments of the present disclosure may be practiced. The computing system 100 includes one or more host computer systems 102$_1$ to 102$_N$, collectively identified as host computers 102. Host computer system 102 may be constructed on a desktop, laptop, or server grade hardware platform 104 such as an x86 architecture platform. As shown, hardware platform 104 of each host 102 may include conventional components of a computing device, such as one or more processors (CPUs) 106, system memory 108, a network interface 110, a storage interface 112, and other I/O devices such as, for example, a mouse and keyboard (not shown). Processor 106 is configured to execute instructions, for example, executable instructions that perform one or more operations described herein and may be stored in memory 108 and in local storage. Memory 108 is a device allowing information, such as executable instructions, cryptographic keys, virtual disks, configurations, and other data, to be stored and retrieved. Memory 108 may include, for example, one or more random access memory (RAM) modules. Network interface 110 enables host 102 to communicate with another device via a communication medium, such as network 150. Au example of network interface 110 is a network adapter, also referred to as a Network Interface Card (NIC). In some embodiments, a plurality of NICs is included in network interface 110. Storage interface 112 enables host 102 to communicate with one or more network data storage systems that may, for example, store virtual disks that are accessed by virtual machines. Examples of storage interface 112 are a host bus adapter (HBA) that couples host 102 to a storage area network (SAN) or a network file system interface. In some embodiments, the storage interface 112 may be a network-enabled storage interface such as FibreChannel, and Internet Small Computer system Interface (iSCSI). By way of example, storage interface may be a FibreChannel host bus adapter (HBA) having a data transfer rate sufficient to transfer a complete execution state of a virtual machine, e.g., 4-Gbps, 8-Gbps, 16-Gbps FibreChannel HBAs.

In the embodiment shown, data storage for host computer 102 is served by a SAN 132, which includes a storage array 134 (e.g., a disk array), and a switch 136 that connects storage array 134 to host computer system 102 via storage interface 112. SAN 132 is accessible by both a first host $102_1$ and a second host $102_N$ (i.e., via respective storage interfaces 112), and as such, may be designated as a "shared storage" for hosts 102. In one embodiment, storage array 134 may include a data store 138 configured for storing virtual machine files and other data that facilitates techniques for virtual machine migration, as described below. Switch 136, illustrated in the embodiment of FIG. 1, is a SAN fabric switch, but other types of switches may be used. In addition, distributed storage systems other than SAN, e.g., network attached storage, may be used.

A virtualization software layer, also referred to hereinafter as hypervisor 114, is installed on top of hardware platform 104. Hypervisor 114 supports a virtual machine execution space 116 within which multiple VM processes may be concurrently executed to instantiate VMs $120_1$-$120_N$. For each of VMs $120_1$-$120_N$, hypervisor 114 manages a corresponding virtual hardware platform 122 that includes emulated hardware such as a virtual CPU 124, virtual RAM 126 (interchangeably referred to as guest physical RAM or vRAM), virtual NIC 128, and one or more virtual disks or hard drive 130. For example, virtual hardware platform 122 may function as an equivalent of a standard x86 hardware architecture such that any x86 supported operating system, e.g., Microsoft Windows® Linux®, Solaris® x86, NetWare, FreeBSD, etc., may be installed as a guest operating system 140 to execute any supported application in an application layer 142 for a VM 120. Device driver layers in guest operating system 140 of VM 120 includes device drivers (not shown) that interact with emulated devices in virtual hardware platform 122 as if such emulated devices were the actual physical devices. Hypervisor 114 is responsible for taking requests from such device drivers and translating the requests into corresponding requests for real device drivers in a device driver layer of hypervisor 114. The device drivers in device driver layer then communicate with real devices in hardware platform 104.

It should be recognized that the various terms, layers and categorizations used to describe the virtualization components in FIG. 1 may be referred to differently without departing from their functionality or the spirit or scope of the invention. For example, virtual hardware platforms 122 may be considered to be part of virtual machine monitors (VMM) $140_1$-$140_N$ which implement the virtual system support needed to coordinate operations between hypervisor 114 and their respective VMs. Alternatively, virtual hardware platforms 122 may also be considered to be separate from VMMs $140_1$-$140_N$, and VMMs $140_1$-$140_N$ may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Computing system 100 may include a virtualization management module 144 that may communicate to the plurality of hosts 102 via network 150, sometimes referred to as a management network. In one embodiment, virtualization management module 144 is a computer program that resides and executes in a central server, which may reside in computing system 100, or alternatively, running as a VM in one of hosts 102. One example of a virtualization management module is the vCenter® Server product made available from VMware, Inc. Virtualization management module 144 is configured to carry out administrative tasks for the computing system 100, including managing hosts 102, managing VMs running within each host 102, provisioning VMs, migrating VMs from one host to another host, and load balancing between hosts 102.

In one or more embodiments, virtualization management module 144 may organize hosts 102 into one or more clusters that aggregate and manage the combined resources of the hosts as a single collection. Virtualization management module 144 may be configured to provide high-availability (HA) functionality that provides automatic failover for any VMs executing within the cluster of hosts 102. For example, upon detecting a host has failed, virtualization management module 144 automatically restarts any affected VMs 120 that were on the failed host on a different host within the cluster. Virtualization management module 144 monitors all hosts 102 in the cluster using an agent, depicted in FIG. 1 as an HA agent 146, executing on each host 102. HA agents 146 are configured to maintain a "heartbeat" with virtualization management module 144, and in some embodiments, with other hosts 102, via network 150. In other embodiments, a host 102 in the cluster may be designated as a master or primary host and be given the responsibilities of monitoring the state of other hosts 102 within the cluster, which includes hosts designated as slave or secondary hosts, and orchestrating restarts and failovers of VMs within the cluster.

When a host is running but loses network connectivity (i.e., no longer receives heartbeats and/or unable to ping gateway), a state of network isolation may be declared and the host performs a corresponding course of action, referred to as an isolation response, with regards to the VMs executing on the isolated host. In the embodiment shown in FIG. 1, host $102_1$ has lost network connectivity to network 150, as depicted by the crossed link 152, but may still have access to the shared storage system of SAN 132, as depicted by link 154. HA agent 146 executing on host $102_1$ is configured to perform the appropriate isolation response when host $102_1$ becomes network isolated.

In one or more embodiments, virtualization management module 144 may be configured to associate (e.g., via user input) a particular isolation response for one or more VMs 120 that determines the course of action that should be performed in response to network isolation of the host on which the VM executes. The isolation response May be configured (e.g., by user input) for all VMs executing in the entire cluster of hosts 102, for all VMs executing on particular host 102, and/or for individual VMs. In some embodiments, the isolation response may include a Power-Off option, in which VM(s) on the isolated host are powered off in a "hard stop" manner, and a Shut-down option, in which VM(s) on the isolated host perform a guest-initiated shutdown procedure. When a VM is powered off or shut-down in case of host isolation, the shared storage lock in data store 138 is released, which allows the VM to be started up in another (non-isolated) host in the cluster. In some embodiments, the isolation response may include a Leave-Powered-On option, in which VM(s) on the isolated host remain powered on and continue running even though the host can no longer communicate with other hosts (i.e., no response, and the state of the VM(s) is unchanged.)

However, in such embodiments, if the VMs remain powered on during network isolation, the VM may not be accessible for any user because the host is isolated within the network. Further, if the VMs on the isolated host are powered off or shut down (and corresponding VMs are launched on other hosts in the cluster), the execution state of the VM after network isolation has occurred will be lost. The execution state of a virtual machine refers the state of guest operating system 140 and any applications running in the VM, which may be represented by data stored in virtual hardware platform 122, including the individual states of virtual devices, such as vCPU 124, vRAM 126, vNIC 128, and vDisk 130.

Accordingly, embodiments of the present disclosure provide isolation response mechanisms that transfer the execution of a. VM to another host while maintaining the execution state of the VM after network isolation occurred. As described further below, the isolation response mechanisms for a VM may include a live migration operation that uses shared storage system to transfer the execution state of the VM, a suspend-resume operation that preserves the execution state of the VM, and a snapshot reversion operation that maintains the execution state of the VM using snapshots stored within a shared storage system.

Isolation Response: VM Live Migration Using Shared Storage

Figure 2:
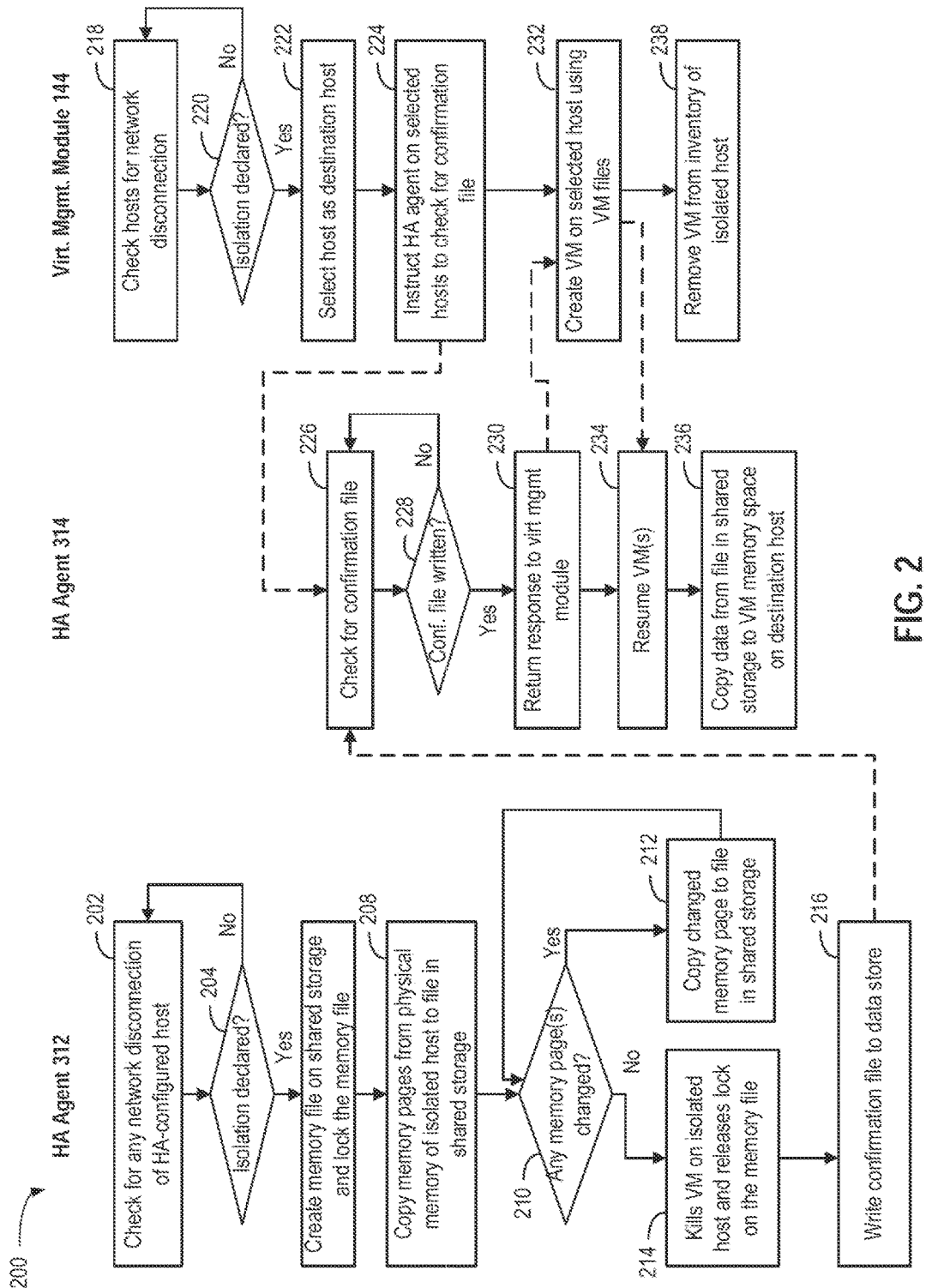
FIG. 2 is a flow diagram that illustrates a method of migrating virtual machines from an isolated host to another host in a shared storage environment, according to an embodiment of the present disclosure.

FIG. 2 is a flow diagram that illustrates steps for a method 200 of migrating a VM from an isolated host to another host in a same cluster in a shared storage environment, according to an embodiment of the present disclosure. The method 200 will be described concurrently with FIG. 2, which is a block diagram depicting a system for migrating a VM from one host to another using shared storage, according to one embodiment of the present disclosure. It should be recognized that, even though the method is described in conjunction with the system of FIGS. 1 and 3, any system configured to perform the method steps is within the scope of embodiments of the disclosure.

The method 200 begins at step 202, where a HA agent 146 executing on a HA-enabled host checks for any network disconnection of the HA-enabled host. In the example shown in FIG. 3, HA agent 312 executing on a host 302 may declare host network isolation when host 302 is still running but HA agent 146 can no longer observe network traffic from other HA agents or virtualization management module 144 on network 150. In some embodiments, host network isolation may be declared when HA agent 312 is unable to communicate with or receive heartbeat messages from other HA agents 314, 316 running on other hosts for a threshold period of time. For example, in embodiments having master hosts and slave hosts an HA agent 146 executing on a master host may declare network isolation if heartbeat messages have not been received in 5 seconds, while HA agents 146 executing on slave hosts may declare isolation within 30 seconds. In some embodiments, if heartbeat messages have not been received, HA agent 312 may attempt to ping a predetermined network address, referred to as an isolation address, which may be a default gateway address of network 150, and failing that, declares network isolation. At step 204, responsive to determining a state of network isolation has been declared, HA agent 312 proceeds to step 206. Otherwise, HA agent 312 returns to step 202 and continues to check for any loss in network connectivity.

At step 206, for each running VM having an associated isolation response of live migration using shared storage, HA agent 312 executing on the network isolated host 302 creates a memory file within the shared storage system (e.g., data store 138) accessible by other hosts 304, 306 within the cluster and locks memory file. The contents of the memory file for a VM represents the entire execution state of VM memory for that VM. The memory file for a particular VM may be created within a location in data store 138 associated that particular VM, such as a VM directory. In the embodiment shown in FIG. 3, HA agent 312 creates a memory file 332 associated with VM1 308 within VM1 directory 330, and creates another memory file 342 associated with VM2 310 within VM2 directory 340. VM1 directory 330 and VM2 directory 340 may contain other files and data associated with the execution and state of a VM, including one or more virtual disk files (e.g., VMDK files) that store the contents of source VM's virtual hard disk drive 130, VM-related configuration files (e.g., ".vmx" files), a paging file (e.g., ".vmem" files) which backs up source VM's memory on the host file system (i.e., in cases of memory over commitment), and log files of the VM's activity, and are depicted by VM1 files 334 and VM2 files 344.

At step 208, HA agent 312 begins copying memory pages from physical memory of the network isolated host representing guest physical memory of a VM to the memory file associated with that VM in shared storage. In one embodiment, HA agent 312 copies memory pages to shared storage using storage interface 112, without copying any of the memory pages through NIC 110 to network 150, as network connectivity is unavailable. In the embodiment shown in FIG. 3, HA agent 312 copies a plurality of memory pages associated with vRAM 318 of VM1 308 to VM1 memory file 332 using storage interface 112, and copies memory pages associated with vRAM 320 of VM2 310 to VM2 memory file 342 using storage interface 112.

In one or more embodiments, HA agent 312 may iteratively copy memory pages to the corresponding memory file in shared storage while VMs 308, 310 continue to run during the copying of VM memory. Hypervisor 114 on host 302 may be configured to track changes to guest memory pages, for example, through traces placed on the guest memory pages. In some embodiments, at step 208, HA agent 312 may copy all of the memory pages of vRAM 126 into memory file 332 as an initial copy. As such, in contrast to the paging file for the VM (e.g., ".vmem" file), which may only contain a partial set of memory pages of guest memory during times of memory over commitment, VM memory file 332 contains the entire memory state of VM 308. At step 210, HA agent 312 determines whether any memory pages associated with a particular VM have been changed since a prior iteration of copying of memory pages was made to memory file 332 in shared storage. If so, at step 212, HA agent 312 copies the changed memory pages to the memory file ire shared storage using storage interface 112. Hypervisor 114 on isolated host 302 may repeatedly identify and copy changed memory pages to memory file 332 in an iterative process until no other changed memory pages are found, or alternatively, until some threshold level of completeness is achieved. For example, changed memory pages may be iteratively copied until a threshold percentage (e.g., 99%) of memory pages has been copied, or, in another example, if the amount of changed memory pages or rate of changed memory pages falls below a threshold value.

At step 214, responsive to determining that the copy process to the memory file is complete, HA agent 312 kills the one or more VMs executing on network isolated host, and releases the lock on memory files 332, 342 within shared storage. In some embodiments, killing VMs 308, 310 causes any locks on VM files 334, 344 previously held by VMs 308, 310 to be released. In alternative embodiments, rather than kill the VMs executing on the isolated host, HA agent 312 may "power off" each of the VMs, or gracefully shut the VMs down by instructing guest operating systems 140 to shut down.

At step 216, HA agent 312 writes a confirmation file for a VM executing on the network isolated host. The confirmation file provides an indication (e.g., to other hosts in the cluster) that the VM is ready to be migrated and resumed in another host in the cluster. In the embodiment shown in FIG. 3, HA agent 312 writes a confirmation file 336 for VM1 within VM1 directory 330, and writes another confirmation file 346 for VM2 within VM2 directory 340. While embodiments provided herein describe individual confirmation files for each VM, other implementations for providing an indication that an isolated VM is ready to be migrated to another host may be used. For example, a single centralized confirmation file may be used that contains entries for each VM prepared to be migrated to another host.

In one or more embodiments, components external to host 302 may also determine that host 302 is network isolated and act accordingly to migrate VMs executing on isolated host 302. At step 218, virtualization management module 144 checks for loss of network connectivity to any of hosts within the cluster. In one embodiment, virtualization management module 144 may periodically check if heartbeat message has been received from each of the hosts in the cluster.

At step 220, virtualization management module 144 may determine that host 302 is network isolated. In some embodiments, the determination is based on detecting the loss of heartbeat messages from that host 302 beyond a threshold period of time. Otherwise, virtualization management module 114 may return to step 218 and continue to monitor hosts 302, 304, 306.

At step 222, responsive to determining a host is network isolated, virtualization management module 144 may select one or more other hosts in the cluster as destination hosts for migrating the VMs on isolated host 302. Virtualization management module 144 may select a destination host for a VM according to known techniques for load balancing and further based on finding hosts having compatible hardware requirements. One example technique for load balancing and VM placement is provided by VMware Distributed Resource Scheduler (DRS) as made available by VMware, Inc. of Palo Alto, Calif. In the embodiment shown in FIG. 3, virtualization management module 144 selects host 304 as a destination host for VM1 and host 306 as a destination host for VM2.

At step 224, virtualization management module 144 may instruct one of hosts 304, 306 that have access to the shared storage system to check for an indication that VMs executing on the network isolated host 302 are ready to be migrated, e.g., a confirmation file 336, 346. In the embodiment shown in FIG. 3, virtualization management module 144 directs (e.g., via signaling over management network 150) HA agent 314 executing on destination host 304 to check VM1 directory 330 for confirmation file 336 associated with VM1 and indicating that VM1 is ready to be migrated. Similarly, virtualization management module 144 directs HA agent 316 executing on destination host 306 to check VM2 directory 340 for confirmation file 346 associated with VM2 and indicating that VM2 is ready to be migrated. In an alternative embodiment, virtualization management module 144 may be configured to have direct access to SAN 132 and may check data store 138 itself according embodiments of the present disclosure.

At step 226, HA agents executing on the selected destination hosts repeatedly check the VM directory associated with VMs to be migrated for a confirmation file. At step 228, HA agent executing on the selected destination hosts may determine whether a confirmation file exists within the shared storage system. If so, HA agents executing on the selected destination hosts proceed to step 230, and return a response to virtualization management module 144 indicating the VMs are ready to be migrated; otherwise the HA agents return to step 226.

At step 232, virtualization management module 144 creates a new VM on the selected destination host using the existing VM files stored in shared storage. For example, virtualization management module 144 instantiates a new VM 308A on selected destination host 304 based on VM1 files 334, which may include VM-related configuration files, the virtual disk files, and VM memory paging files associated with VM1 308. Similarly, virtualization management module 144 instantiates a new VM 310A on selected destination host 306 using VM2 files 344 associated with VM2 310. In some embodiments, as new VM 308A may be instantiated based on the same VM-related configuration files as VM 308, new VM 308A may have the same configurations and settings as VM 308, such as resource allocation settings (e.g., 4 GB of vRAM, two dual-core vCPUs), and network settings (e.g., IP address, subnet mask).

At step 234, HA agent executing on the selected destination hosts resume the new instantiated VMs on the destination host. For example, HA agent 314 and 316 executing on destination host 304 and 306 resumes operation of VMs 308A and 310A, respectively.

At step 236, the HA agents executing on the destination hosts copy data from the memory file associated with a migrated VM to a VM memory space associated with that VM the respective destination host, using a storage interface 112. For example, HA agent 314 executing on host 304 copies data from memory file 332 associated with VM1 into vRAM 318 on host 304. HA agent 316 executing on host 306 copies data from memory file 342 associated with VM2 into vRAM 320 for VM2 on host 306. In some embodiments, data from the memory file may be copied using a resume-during-page-in (RDPI) or stun-during-page-send (SDPS) techniques that enable resumption of a VM (e.g., VMs 308A and 310A) even though data VM memory has not yet been fully copied. Using this technique, VMs 308A, 310A resume operation and copy any data to the host physical memory space from memory files 332, 342, based on page faults. In one embodiment, after copying all data from the memory file has been completed, the HA agent on the destination host may delete the memory file from data store 138.

At step 238, virtualization management module 144 removes the VMs 308, 310 from the inventory of the isolated host. In some cases, while virtualization management module 144 may remove entries corresponding to VMs 308, 310 from its end, isolated host 302 may still have VMs 308, 310 registered within an internal inventory. If network connectivity were to be later restored to isolated host 302, the internal inventory would contain stale entries for VMs 308, 310. In one embodiment, virtualization management module 144 notifies HA agent 312 executing on isolated host 302 (e.g., via the shared storage system) to remove VMs 308, 310 from the inventory of isolated host 302. In some embodiments, virtualization management module communicates an indication that VMs (e.g., 308, 310) may be removed from the internal inventory of isolated host 302. In some embodiments, virtualization management module 144 may instruct non-isolated hosts (e.g., hosts 304, 306) that have access to the shared storage to write the indication on its behalf, or in other embodiments, virtualization management module 144 may have direct access to shared storage and may write the indication directly. In some embodiments, the indication written to shared storage may be some value added to the confirmation file (e.g., 336, 346) that signals to HA agent 312 that VMs (e.g., 308, 310) may be removed. In other embodiments, the indication written to shared storage may be a separate file within VM directories 330, 340 (e.g., "remove-vm.txt") that indicates a VM may be removed from the internal inventory of isolated host 302. HA agent 312 detects the indication in shared storage (e.g., change in confirmation files, or new remove-vm.txt file) and removes VMs 308, 310 responsive to the detected indication.

Figure 3:
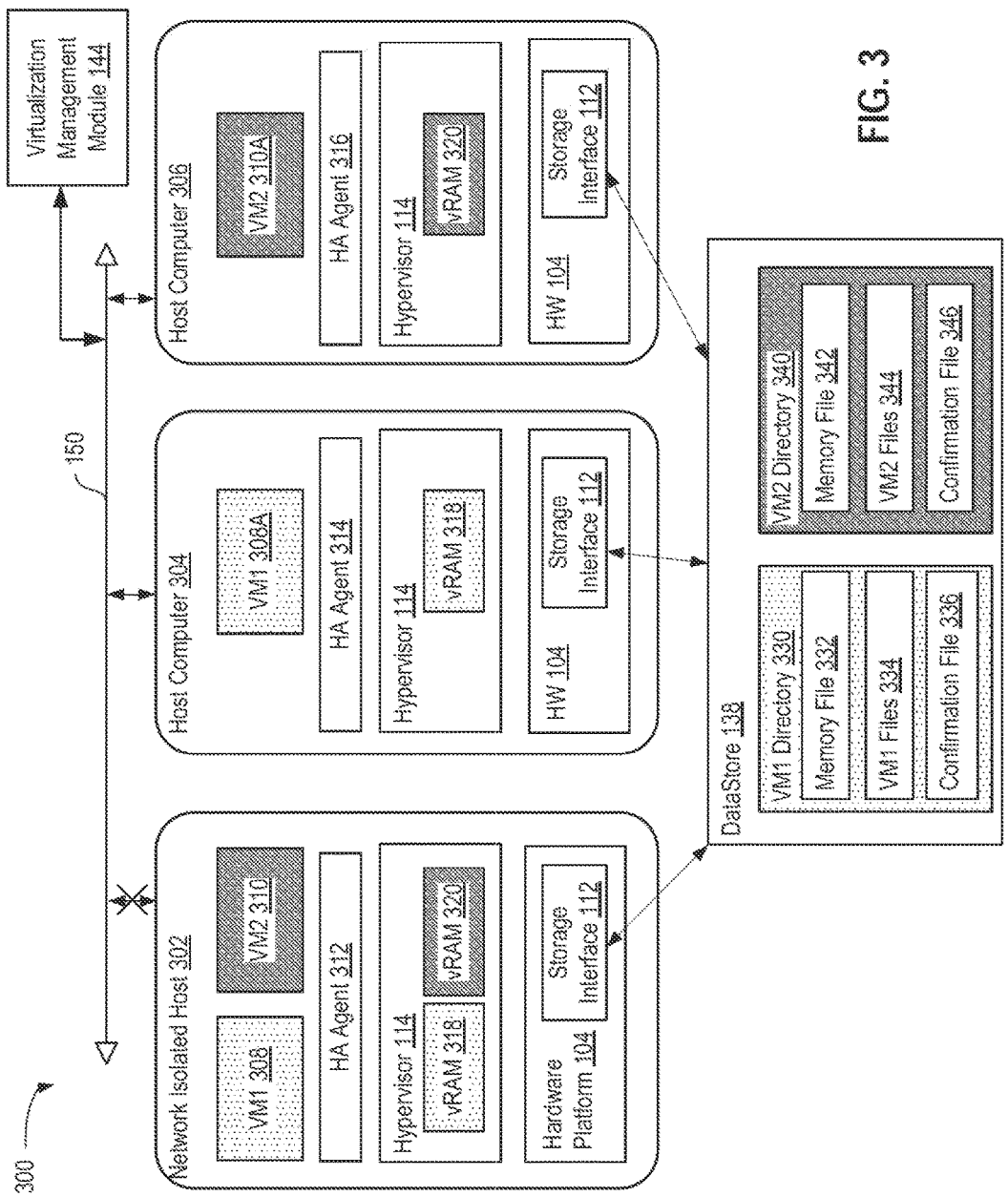
FIG. 3 is a block diagram depicting a system for migrating a virtual machine from one host to another host using shared storage, according to one embodiment of the present disclosure.

As shown in FIG. 3, at this point, all VMs (e.g., 308, 310) executing on isolated host 302 and having an associated isolation response of live migration, have been migrated to another host (e.g., 304, 306, respectively). Accordingly, the execution state of the guest operating system and state of the applications for VMs 308, 310 are maintained even after host isolation has occurred. A user may be able to access the VMs 308A, 310A after live migration using the shared storage system is completed. Embodiments described herein provide live migration without requiring additional hardware, such as additional high-speed NICs or switches for a separate duplicate network dedicated for live migration.

Isolation Response: Suspend/Resume Using Shared Storage

Figure 4:
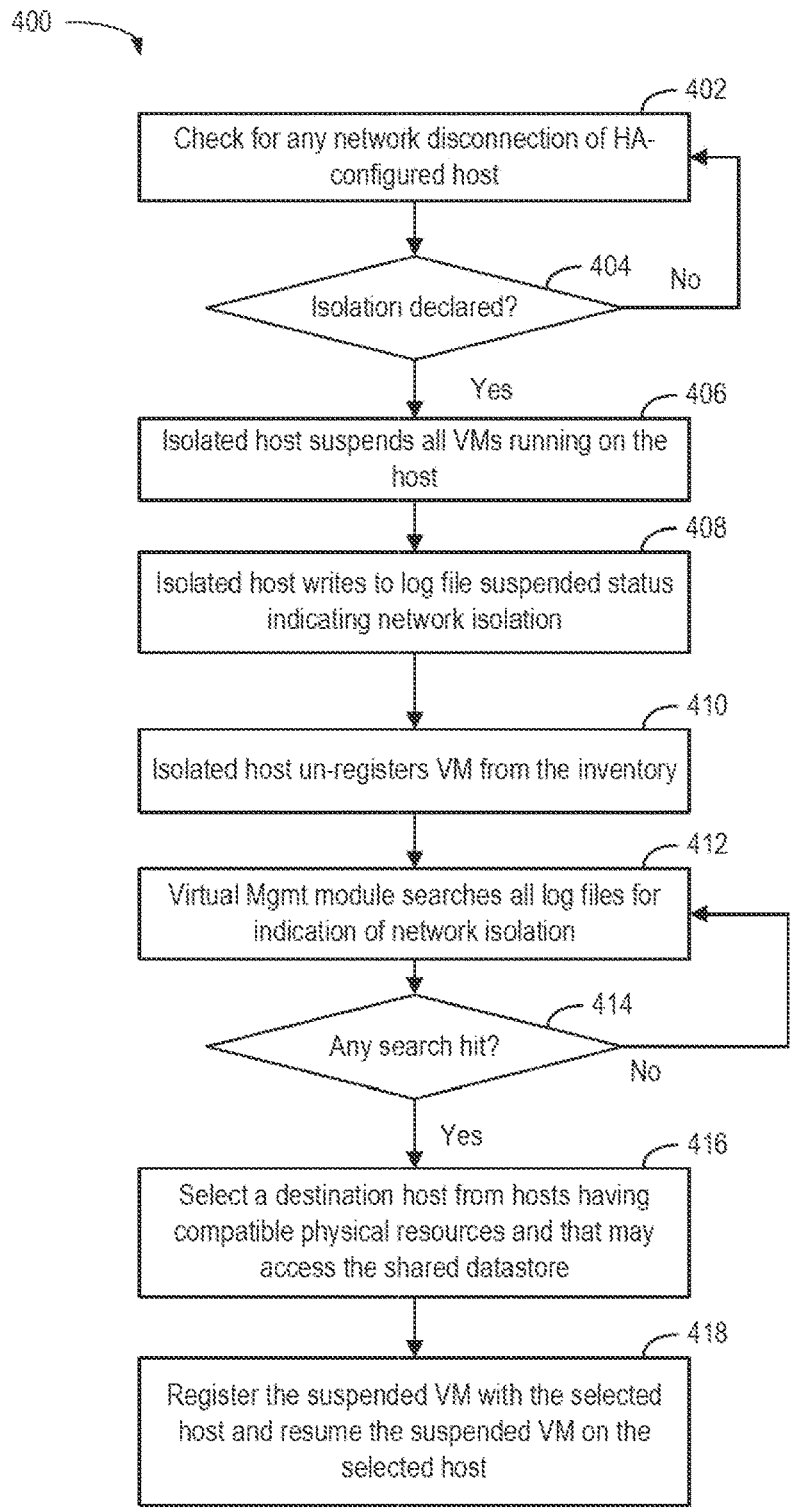
FIG. 4 is a flow diagram that illustrates a method for saving execution state of a VM in case of network isolation, according to an embodiment of the present disclosure.

FIG. 4 is a flow diagram that illustrates steps for a method 400 of saving the execution state of a VM in case of network isolation, according to an embodiment of the present disclosure. The method 400 will be described concurrently with FIG. 5, which is a block diagram depicting a system 500 for saving the execution state of a VM running on a network isolated host, according to one embodiment of the present disclosure. It should be recognized that, even though the method is described in conjunction with the system of FIGS. 1 and 5, any system configured to perform the method steps is within the scope of embodiments of the disclosure.

The method 400 begins at step 402, where an HA agent executing on a HA-enabled host checks for any network disconnect of the host, as described above. In the example shown in FIG. 5, HA agent 512 executing on a host 502 may declare host network isolation when host 502 is still running but HA agent 512 can no longer observe network traffic from other HA agents or virtualization management module 144 on network 150. Similar to the embodiments described above, host network isolation may be declared when HA agent 512 is unable to communicate with or receive heartbeat messages from other HA agents 514, 516 running on other hosts 504, 506 for a threshold period of time. At step 404, responsive to determining a state of network isolation has been declared, HA agent 512 proceeds to step 406. Otherwise, HA agent 512 returns to step 402 and continues to check for any loss in network connectivity.

At step 406, responsive to determining a state of isolation has been declared, HA agent 512 executing on the isolated host suspends all VMs executing on the isolated host that are configured to have a suspend operation as the isolation response. In the embodiment shown in FIG. 5, HA agent 512 creates a suspended state file 532 (e.g., .vmss file) that stores the execution state of VM1 508 within VM1 directory 530 in data store 138, and another suspended state file 542 that stores the execution state of VM2 510 within VM2 directory 540 in data store 138.

At step 408, the HA agent executing on the isolated host writes a suspended status to the log files of the suspended VMs. In some embodiments, the log file may indicate a state of network isolation for the reason that the VMs have been suspended. In the embodiment shown in FIG. 5, HA agent 512 writes a log message indicating network isolation to log file 534 associated with VM1 and log file 544 associated with VM2. For example, HA agent 512 may write a log message specifying "suspend completed status=yes, reason for suspend=network isolation." In some embodiments, the log message may further contain isolated host details, such as a hostname or other information identifying isolated host 502. At step 410, HA agent 512 executing on the isolated host 502 un-registers the one or more suspended VMs (e.g., 508, 510) from the inventory associated with the isolated host 502.

At step 412, virtualization management module 144 searches all log files for an indication of network isolation. In one embodiment, responsive to determining that host 502 may have lost network connectivity (e.g., based on a loss of heartbeat messages), virtualization management module 144 may instruct other HA agents 514, 516 executing on other hosts 504, 506 to check log files 534, 544 associated with VMs 508, 510.

At step 414, if virtualization management module 144 determines a log file associated with a VM contains an indication of network isolation, virtualization management module 144 proceeds to step 416. Otherwise, virtualization management module 144 returns to step 412 and continues to check for indications of network isolation within the log files.

At step 416, virtualization management module 144 selects a destination host from among the plurality of hosts having compatible physical computing resources and that have access to data store 138. In the embodiment shown in FIG. 5, virtualization management module 144 selects and designates host 504 as the destination host for suspended VMs from network isolated host 502.

Figure 5:
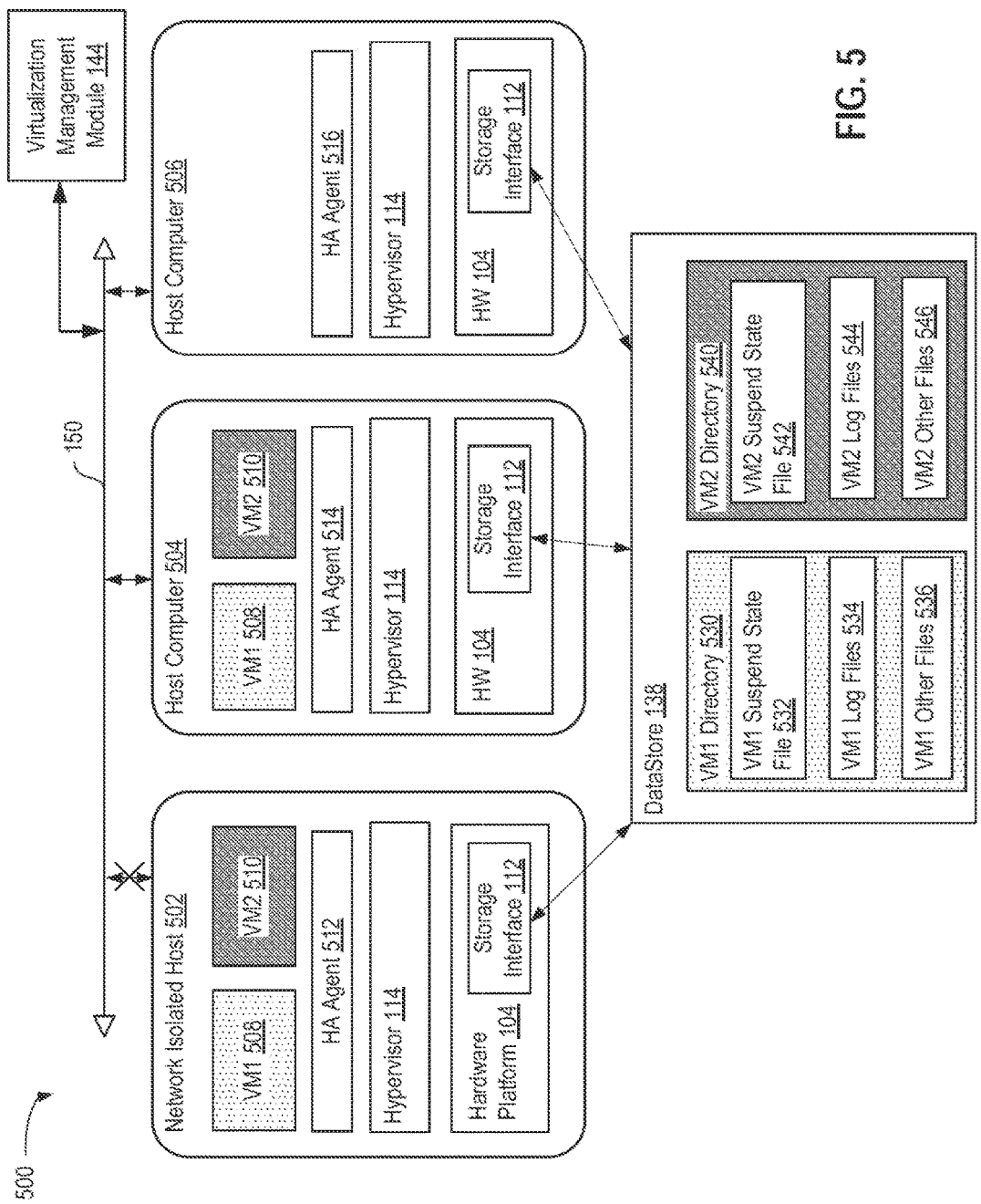
FIG. 5 is a block diagram depicting a system for saving execution state of a VM in case of network isolation, according to one embodiment of the present disclosure.

At step 418, virtualization management module 144 registers the one or more suspended VMs 508, 510 with the selected destination host (e.g., host 504), and resumes the suspended VMs on the selected host. While FIG. 5 depicts all VMs 508, 510 suspended from isolated host 502 being resumed on the same destination host 504, it should be recognized that the suspended VMs may be distributed across multiple available hosts within the cluster of hosts, as determined by virtualization management module 144.

Isolation Response: Snapshot Reversion Using Shared Storage

Figure 6:
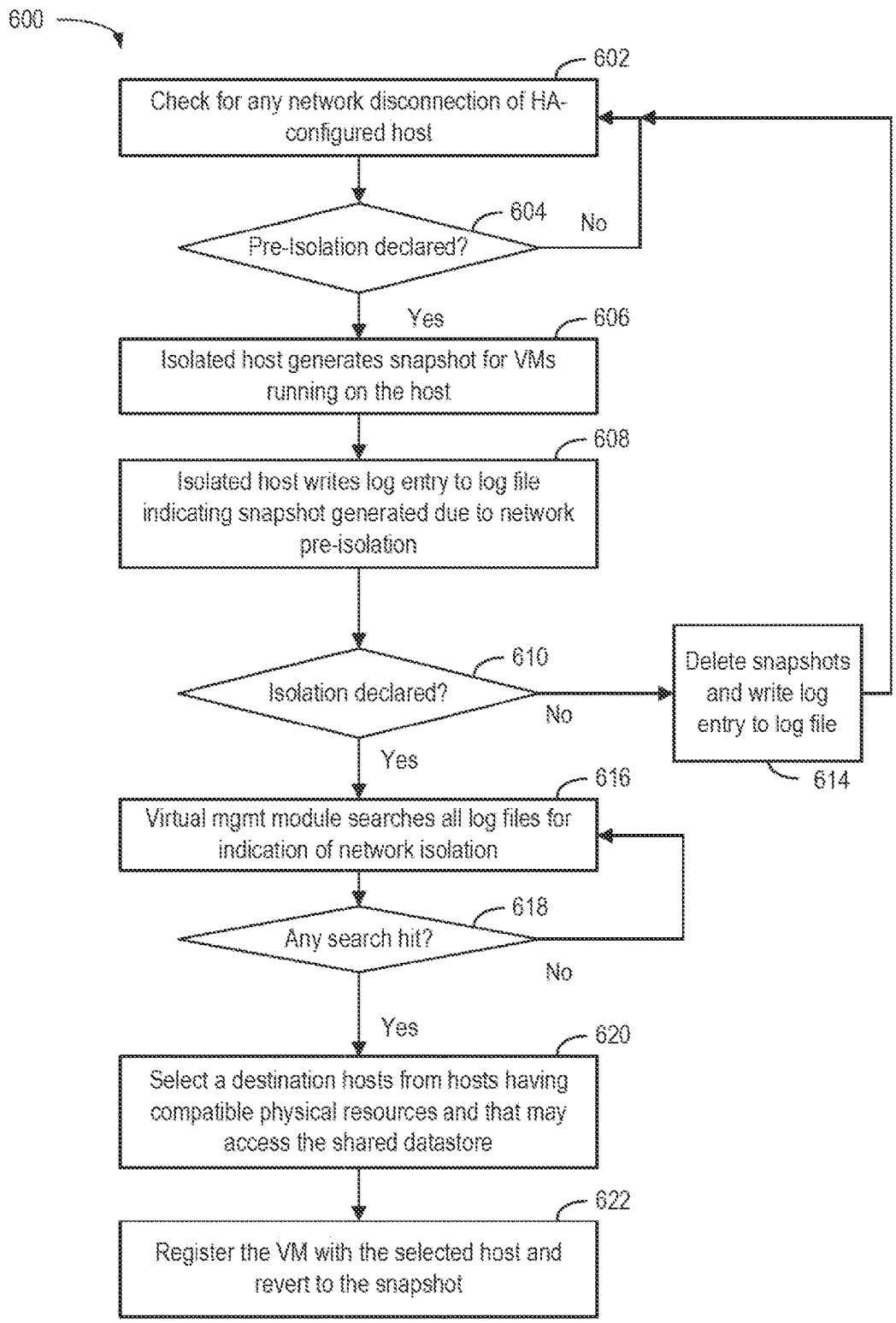
FIG. 6 is a flow diagram that illustrates a method for saving execution state of a VM in case of network isolation, according to another embodiment of the present disclosure.

FIG. 6 is a flow diagram that illustrates steps for a method 600 of saving the execution state of a VM in case of network isolation, according to an embodiment of the present disclosure. The method 600 will be described concurrently with FIG. 7, which is a block diagram depicting a system 700 for saving the execution state of a VM running on a network isolated host, according to one embodiment of the present disclosure. It should be recognized that, even though the method is described in conjunction with the system of FIGS. 1 and 7, any system configured to perform the method steps is within the scope of embodiments of the disclosure.

The method 600 begins at step 602, where an HA agent executing on a HA-enabled host checks for any network disconnect of the host, as described above. In the example shown in FIG. 7, HA agent 712 executing on a host 702 may declare host network isolation when host 702 is still running but HA agent 712 can no longer observe network traffic from other HA agents or virtualization management module 144 on network 150. Similar to the embodiments described above, host network isolation may be declared when HA agent 712 is unable to communicate with or receive heartbeat messages from other HA agents 714, 716 running on other hosts 704, 706 for a threshold period of time.

In one or more embodiments, declaration of network isolation may be broken into multiple stages, such as "pre-isolation" and "isolation." Pre-isolation refers to a preliminary state of network isolation characterized by a loss of network connectivity (e.g., as determined using heartbeat messages from other HA agents) for a first threshold period of time, and isolation refers to a final state characterized by a loss of network connectivity for a second (and generally longer) threshold period of time. For example, a state of pre-isolation may be declared after 5 seconds of loss of network connectivity, while a state of isolation may be declared after 30 seconds of no connectivity.

At step 604, responsive to determining a state of network pre-isolation has been declared, HA agent 714 proceeds to step 606, and take initial preliminary steps to save the execution state of VMs executing on the host, such as generating snapshots. Otherwise, HA agent 712 returns to step 602 and continues to check for any loss in network connectivity.

At step 606, HA agent 712 executing on a host 702 generates one or more snapshots for each running VM having an associated isolation response of a revert-to-snapshot operation. In the embodiment shown in FIG. 7, HA agent 712 generates a first snapshot 732 associated with VM1 708 and stored within VM1 directory 730. Similarly, HA agent 712 generates a second snapshot 742 associated with VM2 710 and stored within VM2 directory 740.

Figure 7:
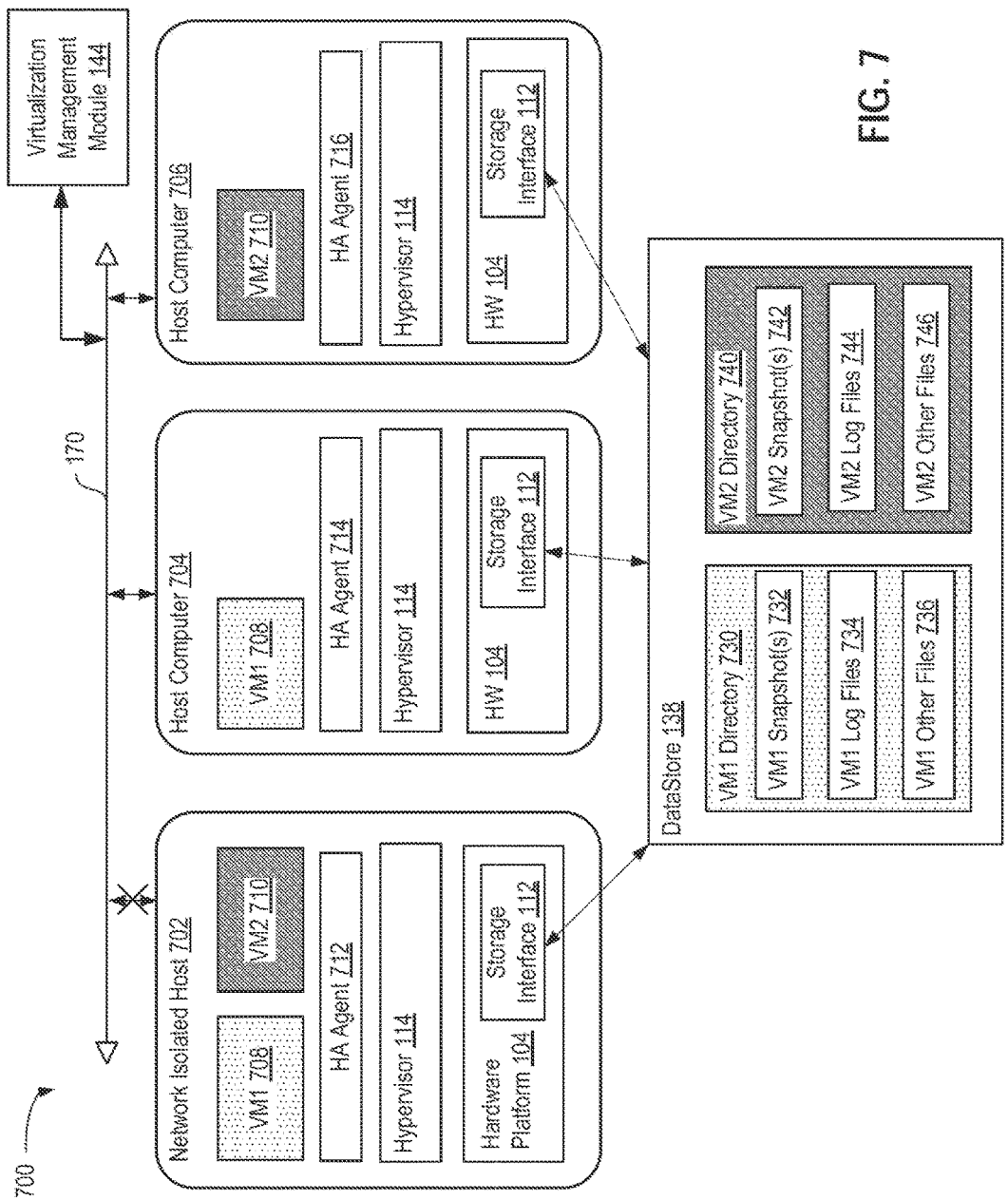
FIG. 7 is a block diagram depicting a system for saving execution state of a VM in case of network isolation, according to another embodiment of the present disclosure.

At step 608, HA agent 712 may write a log entry to a log file associated with each running VM indicating a snapshot was generated due to network isolation. As shown in FIG. 7, HA agent 712 writes log entries to VM log files 734, 744 associated with VM1 708 and VM2 710, respectively, indicating a particular snapshot has been successfully generated and was generated due to a state of network pre-isolation. For example, HA agent 712 may write a log entry specifying "snapshot name='abc', snapshot completed status=yes, reason for snapshot=network pre-isolation, isolated host details='hostname.'.

At step 610, HA agent 712 determines whether a state of network isolation has been declared. As discussed above, HA agent 712 may declare a state of network isolation based on a loss of network connectivity for a second threshold period of time. If HA agent 712 determines that network isolation has not been declared and network connectivity has been restored, HA agent 712 may delete snapshots generated during pre-isolation, and may return to step 602. In some embodiments, HA agent 712 may write a log entry to VM log files indicating that isolation has not been declared because network connectivity resumed after pre-isolation.

At step 616, virtualization management module 144 searches all log files for an indication of network isolation. In one embodiment, responsive to determining that host 702 may have lost network connectivity (e.g., based on a loss of heartbeat messages from HA agent 712), virtualization management module 144 may instruct other HA agents 714, 716 executing on other hosts 704, 706 to check log files 734, 744 associated with VMs 708, 710.

At step 618, if virtualization management module 144 determines a log file associated with a VMS contains an indication of network isolation, virtualization management module 144 proceeds to step 620. Otherwise, virtualization management module 144 returns to step 616 and continues to check for indications of network isolation within the log files.

At step 620, virtualization management module 144 selects a destination host from among the plurality of hosts having compatible physical computing resources and that have access to data store 138. In the embodiment shown in FIG. 7, virtualization management module 144 selects and designates host 704 as the destination host for VMs from network isolated host 702.

At step 622, virtualization management module 144 registers the one or more VMs 708, 710 with the selected destination host (e.g., host 704), and reverts to snapshots 732, 742 stored in shared storage. In one embodiment, virtualization management module 144 may issue to a destination host 704 a "revert snapshot" command that identifies a particular snapshot as specified in the log files (e.g., snapshot "abc"). In some embodiments, after VMs 708, 710 are resumed and running on a destination host with the guest operating system and application state maintained, the snapshots may be removed.

While embodiments of the present disclosure have described the isolation responses (e.g., a live migration operation, a suspend-resume operation, and a snapshot reversion) separately, it should be noted different isolation responses may be used for any or all of the VMs on a network isolated host. For example, according to the HA-related configurations set for VMs within the cluster, a first VM on a network isolated host may be configured to perform a live migration to another host, while a second VM on the isolated host might be configured to perform a snapshot reversion, as described herein.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method, comprising:
   maintaining, by a first agent executing on a first host of a plurality of hosts on a network, a heartbeat message with other hosts of the plurality of hosts or a virtualization management module that supports the plurality of hosts;
   detecting network isolation of the first host, by the first agent, when the first agent observes a disconnection of the first host from the network by failing to receive the heartbeat message from any of the other hosts or the virtualization management module for a period of time, which varies based on a type of the first host, wherein the first host comprises a first virtual machine (VM) executing thereon, and wherein the plurality of hosts are configured to access a shared storage system;
   determining the first VM remains powered on during network isolation; and
   transferring execution of the first VM to a second host of the plurality of hosts using the shared storage system, wherein an execution state of the first VM after network isolation has occurred is maintained, wherein the execution state of the first VM comprises a set of memory pages, is transferred to the second host without copying the set of memory pages through the network.

2. The method of claim 1, wherein transferring execution of the first VM comprises performing an isolation response associated with the first VM, wherein the isolation response is selected from a group consisting of a live migration operation, a suspend-resume operation, and a snapshot reversion.

3. The method of claim 1, wherein transferring execution of the first VM comprises:
   copying, by operation of the first agent, VM memory to a memory file stored in the shared storage system, wherein the first host has a lock on the memory file;
   responsive to determining that the copying to the memory file is complete, by operation of the first agent, releasing the lock on the memory file; and
   generating, by operation of the first agent, a confirmation file on the shared storage system.

4. The method of claim 3, wherein transferring execution of the first VM further comprises:
   instantiating a second VM on the second host, wherein the second VM is based on one or more files associated with the first VM and stored in the shared storage system;
   determining, by operation of a second agent executing on the second host, that the confirmation file has been generated on the shared storage system;
   copying data from the memory file into VM memory associated with the second VM using a storage interface of the second host; and
   removing the first VM from the first host.

5. The method of claim 1, wherein transferring execution of the first VM comprises:
   responsive to detecting a preliminary state of network isolation of the first host, generating a snapshot for the first VM; and
   writing a log message to a log file associated with the first VM and stored in the shared storage system.

6. The method of claim 5, wherein transferring execution of the first VM further comprises:
   reverting the generated snapshot on the second host responsive to determining the log file associated with the first VM contains an indication that the snapshot has been generated due to network isolation; and
   responsive to detecting that network connectivity to the first host has been restored, deleting the generated snapshot.

7. The method of claim 1, wherein transferring execution of the first VM comprises:
   suspending operation of the first VM executing on the first host;
   writing a log message to a log file associated with the first VM and stored in the shared storage system;
   un-registering the first VM from an inventory of the first host;
   responsive to determining the log file associated with the first VM contains an indication that the first VM has been suspended due to network isolation, registering the first VM on an inventory of the second host; and resuming operation of the first VM on the second host.

8. The method of claim 1, wherein the first agent observes the disconnection from the network further comprises:
in response to the first agent failing to receive the heartbeat message, attempting, by the first agent, to ping a default gateway address associated with the network.

9. A non-transitory computer-readable storage medium comprising instructions that, in response to execution by a computing device, perform a method of migrating a first virtual machine (VM) executing on a first host of a plurality of hosts on a network, the method comprising:
maintaining, by a first agent executing on the first host, a heartbeat message with other hosts of the plurality of hosts or a virtualization management module that supports the plurality of hosts;
detecting network isolation of the first host, by the first agent, when the first agent observes a disconnection of the first host from the network by failing to receive the heartbeat message from any of the other hosts or the virtualization management module for a period of time, which varies based on a type of the first host, wherein the plurality of hosts are configured to access a shared storage system;
determining the first VM remains powered on during network isolation; and
transferring execution of the first VM to a second host of the plurality of hosts using the shared storage system, wherein an execution state of the first VM after network isolation has occurred is maintained, wherein the execution state of the first VM comprises a set of memory pages, is transferred to the second host without copying the set of memory pages through the network as the network connectivity is unavailable.

10. The non-transitory computer-readable storage medium of claim 9, wherein the step of transferring execution of the first VM comprises performing an isolation response associated with the first VM, wherein the isolation response is selected from a group consisting of a live migration operation, a suspend-resume operation, and a snapshot reversion.

11. The non-transitory computer-readable storage medium of claim 9, wherein the step of transferring execution of the first VM comprises:
copying, by operation of the first agent, VM memory to a memory file stored in the shared storage system, wherein the first host has a lock on the memory file;
responsive to determining that the copying to the memory file is complete, by operation of the first agent, releasing the lock on the memory file; and
generating, by operation of the first agent, a confirmation file on the shared storage system.

12. The non-transitory computer-readable storage medium of claim 11, wherein the step of transferring execution of the first VM further comprises:
instantiating a second VM on the second host, wherein the second VM is based on one or more files associated with the first VM and stored in the shared storage system;
determining, by operation of a second agent executing on the second host, that the confirmation file has been generated on the shared storage system;
copying data from the memory file into VM memory associated with the second VM using a storage interface of the second host; and
removing the first VM from the first host.

13. The non-transitory computer-readable storage medium of claim 9, wherein the step of transferring execution of the first VM comprises:
responsive to detecting a preliminary state of network isolation of the first host, generating a snapshot for the first VM; and
writing a log message to a log file associated with the first VM and stored in the shared storage system.

14. The non-transitory computer-readable storage medium of claim 13, wherein the step of transferring execution of the first VM further comprises:
reverting the generated snapshot on the second host responsive to determining the log file associated with the first VM contains an indication that the snapshot has been generated due to network isolation; and
responsive to detecting that network connectivity to the first host has been restored, deleting the generated snapshot.

15. The non-transitory computer-readable storage medium of claim 9, wherein the step of transferring execution of the first VM comprises:
suspending operation of the first VM executing on the first host;
writing a log message to a log file associated with the first VM and stored in the shared storage system;
un-registering the first VM from an inventory of the first host;
responsive to determining the log file associated with the first VM contains an indication that the first VM has been suspended due to network isolation, registering the first VM on an inventory of the second host; and
resuming operation of the first VM on the second host.

16. A computer system comprising:
a plurality of hosts including a first host and a second host, wherein the plurality of hosts are on a network; and
a shared storage system storing one or more files associated with a first virtual machine (VM);
wherein the first host includes a memory, a processor, and a storage interface connected to the shared storage system, wherein the first VM and a first agent are executing on the first host, wherein the processor is programmed to carry out the steps of:
maintaining, by the first agent, a heartbeat message with other hosts of the plurality of hosts or a virtualization management module that supports the plurality of hosts;
detecting network isolation of the first host, by the first agent, when the first agent observes a disconnection of the first host from the network by failing to receive the heartbeat message from any of the other hosts or the virtualization management module for a period of time, which varies based on a type of the first host;
determining the first VM remains powered on during network isolation; and
transferring execution of the first VM to the second host using the shared storage system, wherein an execution state of the first VM after network isolation has occurred is maintained, wherein the execution state of the first VM comprises a set of memory pages, is transferred to the second host without copying the set of memory pages through the network as the network connectivity is unavailable.

17. The computer system of claim 16, wherein the processor programmed to transfer execution of the first VM is further programmed to carry out the steps of:
performing an isolation response associated with the first VM, wherein the isolation response is selected from a group consisting of a live migration operation, a suspend-resume operation, and a snapshot reversion.

18. The computer system of claim 16, wherein the processor programmed to transfer execution of the first VM is further programmed to carry out the steps of:
copying, by operation of the first agent, VM memory to a memory file stored in the shared storage system, wherein the first host has a lock on the memory file;
responsive to determining that the copying to the memory file is complete, by operation of the first agent, releasing the lock on the memory file;
generating, by operation of the first agent, a confirmation file on the shared storage system;
instantiating a second VM on the second host, wherein the second VM is based on one or more files associated with the first VM and stored in the shared storage system;
determining, by operation of a second agent executing on the second host, that the confirmation file has been generated on the shared storage system;
copying data from the memory file into VM memory associated with the second VM using a storage interface of the second host; and
removing the first VM from the first host.

19. The computer system of claim 16, wherein the processor programmed to transfer execution of the first VM is further programmed to carry out the steps of:
responsive to detecting a preliminary state of network isolation of the first host, generating a snapshot for the first VM; and
writing a log message to a log file associated with the first VM and stored in the shared storage system.

20. The computer system of claim 19, wherein the processor programmed to transfer execution of the first VM is further programmed to carry out the steps of:
reverting the generated snapshot on the second host responsive to determining the log file associated with the first VM contains an indication that the snapshot has been generated due to network isolation; and
responsive to detecting that network connectivity to the first host has been restored, deleting the generated snapshot.

21. The computer system of claim 16, wherein the processor programmed to transfer execution of the first VM is further programmed to carry out the steps of:
suspending operation of the first VM executing on the first host;
writing a log message to a log file associated with the first VM and stored in the shared storage system;
un-registering the first VM from an inventory of the first host;
responsive to determining the log file associated with the first VM contains an indication that the first VM has been suspended due to network isolation, registering the first VM on an inventory of the second host; and
resuming operation of the first VM on the second host.

\* \* \* \* \*